(12) United States Patent
Klose-Schubert et al.

(10) Patent No.: US 9,548,498 B2
(45) Date of Patent: Jan. 17, 2017

(54) ELECTROCATALYST FOR FUEL CELLS AND METHOD FOR PRODUCING SAID ELECTROCATALYST

(71) Applicant: Umicore AG & Co. KG, Hanau-Wolfgang (DE)

(72) Inventors: Barbara Klose-Schubert, Frankfurt am Main (DE); Daniel Herein, Frankfurt (DE); Marco Lopez, Frankfurt (DE); Carsten Becker, Nidderau-Ostheim (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 205 days.

(21) Appl. No.: 14/359,201

(22) PCT Filed: Dec. 18, 2012

(86) PCT No.: PCT/EP2012/075922
§ 371 (c)(1),
(2) Date: May 19, 2014

(87) PCT Pub. No.: WO2013/092568
PCT Pub. Date: Jun. 27, 2013

(65) Prior Publication Data
US 2014/0349203 A1 Nov. 27, 2014

(30) Foreign Application Priority Data
Dec. 22, 2011 (EP) .................................... 11195412

(51) Int. Cl.
*H01M 4/86* (2006.01)
*H01M 4/90* (2006.01)
(Continued)

(52) U.S. Cl.
CPC ........ *H01M 4/8657* (2013.01); *C25B 11/0405* (2013.01); *H01M 4/9016* (2013.01);
(Continued)

(58) Field of Classification Search
CPC ...... H01M 8/1011; H01M 8/188; H01M 8/20; H01M 4/8657; H01M 4/9016; H01M 4/9075; H01M 4/921; H01M 4/923; H01M 4/925; H01M 2008/1095; Y02E 60/50; Y02E 60/523; Y02P 70/56; C25B 11/0405
See application file for complete search history.

(56) References Cited

U.S. PATENT DOCUMENTS

2007/0128499 A1 6/2007 Campbell et al.
2009/0065738 A1 3/2009 Weidner et al.
(Continued)

FOREIGN PATENT DOCUMENTS

CN 101 087 022 B 8/2010
EP 1 254 711 A1 11/2002
(Continued)

OTHER PUBLICATIONS

Shao, J Mater Chem 2009, 19, 46-59.
Sung, J Catal 2008, 258, 143-152.

*Primary Examiner* — Brittany Raymond
(74) *Attorney, Agent, or Firm* — Levin Santalone LLP; John Santalone

(57) ABSTRACT

The invention relates to a carbon-free electrocatalyst for fuel cells, containing an electrically conductive substrate and a catalytically active species, wherein the conductive substrate is an inorganic, multi-component substrate material of the composition OX1-OX2, in which OX1 means an electrically non-conductive inorganic oxide having a specific surface area (BET) in the range of 50 to 400 mVg and OX2 means a conductive oxide. The non-conductive inorganic oxide (Continued)

Schematic structure of the electrocatalyst according to the invention

0X1 is coated with the conductive oxide 0X2. The multi-component substrate preferably has a core/shell structure. The multi-component substrate material 0X1-0X2 has an electrical conductivity in the range>0.01 S/cm and is coated with catalytically active particles containing noble metal. The electrocatalysts produced therewith are used in electrochemical devices such as PEM fuel cells and exhibit high corrosion stability.

21 Claims, 1 Drawing Sheet

(51) Int. Cl.
- *H01M 4/92* (2006.01)
- *H01M 8/10* (2016.01)
- *H01M 8/18* (2006.01)
- *H01M 8/20* (2006.01)
- *C25B 11/04* (2006.01)

(52) U.S. Cl.
CPC ......... *H01M 4/9075* (2013.01); *H01M 4/921* (2013.01); *H01M 4/923* (2013.01); *H01M 4/925* (2013.01); *H01M 8/1011* (2013.01); *H01M 8/188* (2013.01); *H01M 8/20* (2013.01); *H01M 8/1007* (2016.02); *H01M 2008/1095* (2013.01); *Y02E 60/50* (2013.01); *Y02E 60/523* (2013.01); *Y02P 70/56* (2015.11)

(56) References Cited

U.S. PATENT DOCUMENTS

| | | |
|---|---|---|
| 2009/0186248 A1 | 7/2009 | Ye |
| 2012/0295184 A1 | 11/2012 | Watanabe et al. |

FOREIGN PATENT DOCUMENTS

| | | | |
|---|---|---|---|
| EP | 1254711 | * | 11/2002 |
| EP | 1 701 790 B1 | | 9/2006 |
| EP | 1701790 | * | 9/2009 |
| WO | 03 / 078056 A1 | | 9/2003 |
| WO | 2006 / 045606 A1 | | 5/2006 |
| WO | 2006 / 119407 A2 | | 11/2006 |
| WO | 2008 / 025750 A1 | | 3/2008 |
| WO | 2011 / 065471 A1 | | 6/2011 |

\* cited by examiner

Schematic structure of the electrocatalyst according to the invention
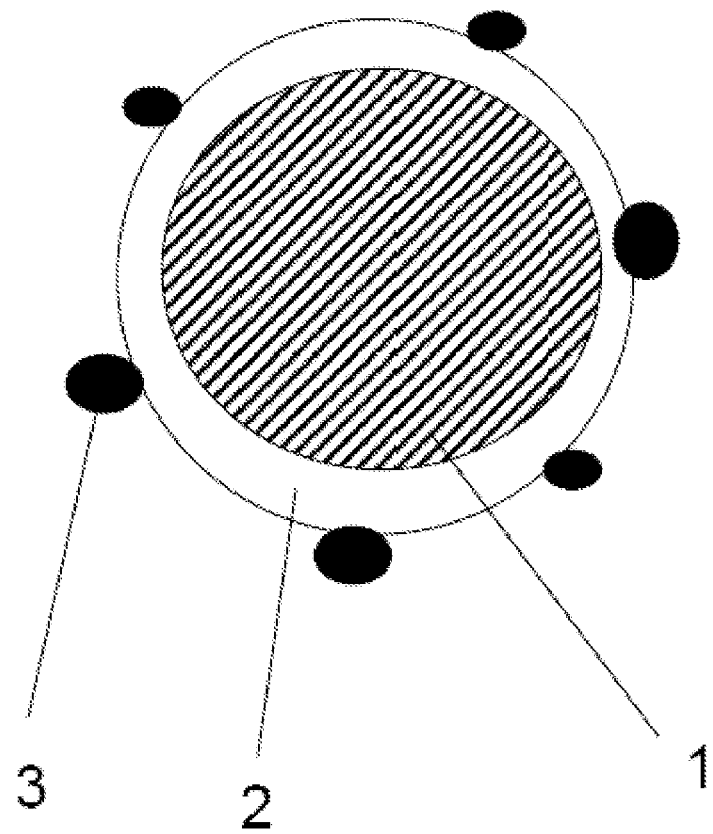

ELECTROCATALYST FOR FUEL CELLS AND METHOD FOR PRODUCING SAID ELECTROCATALYST

Fuel cells are in principle gas-powered batteries in which the energy obtained from the reaction of hydrogen and oxygen (resp., air) is converted directly into electrical energy. The present invention relates to catalysts for fuel cells and in particular to the preparation of supported catalysts based on platinum and platinum alloys, for polymer electrolyte membrane (PEM) fuel cells. This type of fuel cell is gaining increasing importance in mobile applications, i.e., for use in electric vehicles for electotraction, because of its high energy density and robustness.

The advantages of a fuel cell-powered car are the very low emissions and also the high efficiency compared to conventional internal combustion engines. When hydrogen is used as fuel gas, water formed on the cathode side of the cell is the only emission. A so-called ZEV (zero emission vehicle) is then concerned. Compared to battery-powered electric vehicles, fuel cell cars have a significantly longer range.

The PEM fuel cell consists of a stack of membrane electrode assemblies (MEAs) with interleaved bipolar plates for gas supply and current collection. A membrane electrode assembly consists of a solid polymer electrolyte membrane provided on both sides with catalyst-containing reaction layers. One of the reaction layers is configured as an anode for the oxidation of hydrogen and the second reaction layer is configured as a cathode for the reduction of oxygen. Atop these reaction layers there are applied so-called gas distributor structures or gas diffusion layers composed of carbon fiber paper, carbon fiber wovens or carbon fiber nonwovens, which provide the reaction gases with ready access to the electrodes and ensure good collection of the cell current. The anode and cathode comprise so-called electrocatalysts which catalytically support the respective reactions (oxidation of hydrogen at the anode and reduction of oxygen at the cathode). The metals of the platinum group of the periodic table of the elements are preferably used as catalytically active components. So-called supported catalysts in which the catalytically active platinum group metals have been applied in highly disperse form to the surface of a conductive support material are generally used.

Supported catalysts based on platinum and platinum alloys are used as catalysts on the anode and cathode sides of the PEM fuel cell. They comprise fine noble metal particles deposited on a conductive support material (usually carbon black or graphite).

Prior art electrocatalysts are generally supported on conductive carbon (in particular conductivity grade carbon black). The high voltages sometimes arising in mobile applications bring about oxidation of the support and thus a loss of activity. This phenomenon is known as "carbon corrosion".

Using a ceramic support avoids this problem. However, the challenge lies in providing useful conductive ceramic support materials which are highly structured and accordingly have a high surface area, and also obtaining electrocatalysts prepared therewith, having a high active surface area (noble metal dispersion) and a high level of corrosion resistance.

Replacing carbon-based materials with a ceramic support, for example oxides such as doped tin oxide, tungsten oxide or partially reduced titanium oxide ($TiO_x$), is proposed in the literature (cf. Y. Shao et al, J. Mater. Chem., 2009, 19(1), 46-59 and Yung-Eun Sung et al, Journal of Catalysis, 258, 2008, 143-152).

Using doped ceramic oxides as supports is disclosed in US 2009065738 A1 and US 2007128499.

WO 2011/065471 A1 describes ceramic supports such as, for example, antimony tin oxide ("ATO"), having a chain-like structure which is obtainable, for example, in plasma.

The disadvantage of these support materials is that unlike carbon black they are only minimally structured (i.e., have a low BET surface area). This precludes a highly disperse distribution of the catalytically active noble metal-containing particles on the support material, which in turn results in a lower catalytic surface area and hence a lower catalytic activity for the catalyst. Furthermore, they have a uniform support phase consisting of one or more conductive oxides. Particularly when noble metal oxides are used (for example iridium oxide), this makes the support material very expensive.

CN 101087022 B discloses a process for preparing a bifunctional catalyst for a regenerative fuel cell, comprising the subsidiary steps of dispersing an Ir-containing support ($IrO_2$, $IrO_2$—$RuO_2$ or $IrO_2/TiO_2$) in a solution of polyol and water and adding a dispersion of chloride-containing Pt precursors. Nonconducting inorganic oxides are not used.

WO 2006119407 A2 describes fuel cell electrodes comprising a catalyst supported on a nonconductive ceramic oxide. In order to achieve conductivity in the layer, the electrode comprises a conductive matrix composed of metal borides, carbides, nitrides, silicides, oxyborides, oxycarbides, oxynitrides, or carbonitrides.

EP 1701790 B1 discloses noble metal oxide catalysts comprising a high-surface-area inorganic oxide and also Ir oxides and/or Ru oxides, for electrolyzing water. However, they do not have a coating comprising catalytically active particles.

It is an object of the present invention to provide electrocatalysts that are highly corrosion resistant while simultaneously showing high electrical performance, for use in PEM fuel cells. The higher corrosion resistance of these novel catalysts should result in improved start-up/shut-down behaviour (abbreviated to "SUSD") in automotive applications of the PEM fuel cell.

It is a further object of the invention to provide useful support materials for electrocatalysts. These support materials should be electrically conductive and also inexpensive, and should have a reduced proportion of a costly conductive oxide.

Furthermore, the catalysts should be preparable in an industrially usable process and should thereby make a contribution to the commercial adoption of the PEM fuel cell in mobile applications.

These objects are achieved by providing the electrocatalysts according to the accompanying claims.

DETAILED DESCRIPTION OF THE INVENTION

The electrocatalysts according to the invention feature a multicomponent conductive support material composed of a nonconductive structure-conferring oxide component (OX1) and a conductive oxide component (OX2). This multicomponent support material ("composite support material") is coated with a noble metal-containing catalytically active species.

The multicomponent support material (hereinafter referred to as OX1-OX2) generally comprises a nonconductive structure-conferring inorganic oxide of high specific surface area, coated with an electrically conductive oxidic component. The structure-conferring inorganic oxide and also the conductive component are preferably acid-resistant, i.e., stable in the operating conditions prevailing in the PEM fuel cell.

Simultaneously, the multicomponent support materials according to the invention also bring about high dispersion of the catalyst particles deposited thereon, owing to the high support surface area. This in turn leads to a high catalytically active surface area for the resulting electrocatalyst.

The improved corrosion resistance of the electrocatalyst according to the invention is achieved by using as base material a conductive oxidic support which facilitates a fine distribution (i.e., high dispersion) of the catalytically active platinum-containing particles on account of its finely divided structure. As opposed to conventional electrocatalysts with C-containing supports, no corrosion of the carbon support takes place. The electrocatalysts according to the invention are free from carbon, i.e., C-free.

The invention thus relates to an electrocatalyst for fuel cells which comprises an electrically conductive support and also a catalytically active species, wherein the conductive support is an inorganic multicomponent support material of composition OX1-OX2 wherein OX1 is an oxide having a specific surface area (BET) in the range from 50 to 400 $m^2/g$ and OX2 is a conductive oxide.

The multicomponent support material OX1-OX2 has an electrical conductivity in the range of >0.01 S/cm, preferably >0.1 S/cm and more preferably in the range of >1 S/cm.

The inorganic oxide OX1 is not electrically conductive, i.e., is an insulator. Typically, the inorganic oxide OX1 has an electrical conductivity of <$10^{-4}$ S/cm.

The schematic structure of the electrocatalyst according to the invention is shown in FIG. 1. Atop a structure-conferring electrically nonconductive oxide component OX1 (1) there is applied an electrically conductive layer composed of an electrically conductive oxide component OX2 (2). The catalytically active particles P (3) have been applied atop the conductive oxidic component OX2.

Although the layer of the conductive oxide component OX2 is shown schematically as a continuous layer in FIG. 1, in reality it need not be coherent and need not completely envelop the core particle. It is sufficient for the conductive oxide component OX2 to generate an electrically conductive network in the catalyst-containing layer, thus ensuring adequate electrical conductivity (for example via percolation and/or particle-particle contact within the support material).

In a particular embodiment, the multicomponent conductive support material has a core/shell structure. In this embodiment the conductive component OX2 has been applied atop the nonconductive OX1 core in the form of a shell. This shell may be continuous, or else it may be discontinuous with interruptions, pinholes, gaps, agglomerates and defects.

The electrocatalyst according to the invention comprises essentially particles structured according to this principle, but the catalyst according to the invention may also comprise fractions of unenveloped core material OX1, fractions of electrically conductive oxidic component OX2 and also catalytically active species (i.e., noble metal-containing particles P or agglomerates) in isolation. These embodiments of the electrocatalyst are also encompassed by the present invention.

The support material of the catalyst according to the invention comprises an electrically nonconductive structure-conferring inorganic oxide OX1. Inert acid-stable oxides of the main group elements and the transition group elements are generally used as the inorganic oxide. The nonconductive inorganic oxide OX1 is preferably selected from the group titanium oxide ($TiO_2$), aluminum oxide ($Al_2O_3$), silicon dioxide ($SiO_2$), zirconium dioxide ($ZrO_2$), yttrium oxide ($Y_2O_3$), cerium oxide ($Ce_2O_3$), cerium dioxide ($CeO_2$), lanthanum oxide ($La_2O_3$), tin dioxide ($SnO_2$) and also mixtures and combinations thereof. In addition, other oxides, for example oxides of base metals or of lanthanides, may also be comprised for stabilization.

To achieve the structure-conferring properties, the nonconductive oxide should have a high specific surface area (according to BET). This high surface area should be in the range from 50 to 400 $m^2/g$, preferably in the range from 100 to 350 $m^2/g$.

Suitable examples of inorganic oxides include high-surface-area fumed oxides such as $TiO_2$, $Al_2O_3$ or $SiO_2$. Such fumed oxides are, for example, marketed under the name Aerosil® or $TiO_2$ type P25® by Evonik-Degussa. A likewise usable $TiO_2$ material is an anatase modification marketed under the product name "Hombikat" by Sachtleben Chemie (Duisburg).

The structure-conferring inorganic oxide OX1 should be chemically inert and have very low solubility in acid. The latter means that the weight loss upon treatment with mineral acids (e.g., in 1 molar sulfuric acid) is minimal.

The structure-conferring inorganic oxide OX1 is present in the electrocatalyst according to the invention in an amount of from 1 to 90 wt %, preferably to 80 wt %, based on the total weight of the multicomponent support material.

The structure-conferring inorganic oxide OX1 is, at its surface, covered or coated with a conductive oxide which brings about the electrical conductivity of the support material. The conductive oxide OX2 comprises essentially a conductive oxide of a noble or base metal. The conductive oxide OX2 is preferably selected from the group ruthenium (IV) oxide ($RuO_2$), iridium(IV) oxide ($IrO_2$), tungsten oxide ($WO_x$), molybdenum oxide ($MoO_x$), niobium oxide ($NbO_x$), tantalum oxide ($TaO_x$), tin oxide ($SnO_x$), reduced titanium oxide ($TiO_x$) and also mixtures and combinations thereof. The indication "x" is intended to illustrate the non-stoichiometric composition of the conductive oxide.

To stabilize and adjust the conductive properties, the conductive oxide may also include further dopants, for example the metals vanadium, niobium, tantalum or antimony or the halide ions $F^-$ or $Cl^-$ and also mixtures or combinations thereof.

The conductive oxide OX2 is present in the support material in amounts of from 10 to 99 wt %, preferably in amounts of from 20 to 95 wt % (based on the weight of the multicomponent support material). Depending on the specific surface area of the structure-conferring oxide OX1 used, the amount of the conductive oxide OX2 is selected such that a sufficient electrical conductivity of the resulting support material is ensured.

The electrical conductivity of the multicomponent support material OX1-OX2 is typically in the range of >0.01 S/cm, preferably >0.1 S/cm and more preferably >1 S/cm (measured according to the powder method). It was found that, surprisingly, conductivity values in this range are suitable for use as supports in electrocatalysts. Support materials with a lower electrical conductivity lead to high resistances in the catalyst layer and thereby to considerable power losses in the PEM fuel cell.

The oxidic material of the type OX1-OX2 serves as the support material for the electrocatalysts according to the invention. The multicomponent support material may in addition to the components OX1 and OX2 also comprise further oxidic or non-oxidic components (e.g., OX1', OX2', carbides, nitrides, etc.). Such embodiments are also encompassed in the present invention.

In a subsequent step, the catalytically active species is applied atop the inorganic support material OX1-OX2, in the form of fine particles (P). Noble metals are generally used as the catalytically active species. In particular, the noble metals ruthenium, osmium, rhodium, iridium, palladium, platinum, silver and gold and also mixtures and alloys thereof are used. The elements of the platinum group metals ("PGMs"), comprising the noble metals ruthenium, osmium, rhodium, iridium, palladium and platinum and also mixtures and alloys thereof, are preferably used. It is very particularly preferable to use the noble metal platinum (Pt).

In a particular embodiment, noble metal-containing alloy particles may be used as the catalytically active particles. Such alloys comprise alloys of the noble metals with one another (for example platinum/ruthenium or platinum/gold) or those with base metals selected from the group vanadium, chromium, manganese, iron, cobalt, nickel, copper and zinc. Preferred alloys from this group include, for example, platinum/nickel, platinum/cobalt, platinum/copper or ternary alloys such as, for example, platinum/palladium/cobalt, platinum/iridium/cobalt, platinum/palladium/nickel, platinum/iridium/nickel, and also platinum/cobalt/chromium.

The content of catalytically active species (i.e., noble metal, optionally with alloyed elements) in the electrocatalysts according to the invention is between 5 to 60 wt %, preferably between 5 and 40 wt % (in each case based on the total weight of the electrocatalyst).

The mean particle size of the noble metal-containing particles P on the conductive inorganic support material is in the range from 1 to 100 nm, preferably 1.5 to 50 nm, measured using X-ray diffraction (XRD).

Preparing the electrocatalysts according to the invention likewise forms part of the subject matter of the present invention. The production process according to the invention comprises the general steps of a) coating the oxide OX1 with the conductive oxide OX2 by precipitation or impregnation with suitable OX2 precursor compounds, optionally followed by a drying and/or calcining of the resulting conductive support OX1-OX2, b) depositing the catalytically active species onto the support OX1-OX2 by precipitation or impregnation with suitable metal precursor compounds, optionally followed by reduction and/or drying and/or calcining.

These process steps are described in more detail hereinafter.

Step a): coating the structure-conferring oxide OX1 with the conductive oxide OX2 by precipitation from or impregnation with suitable precursor compounds, optionally followed by a drying and/or calcining step. In a typical production process based on EP 1701790 B1, the inorganic high-surface-area oxide is completely dispersed in an aqueous solution. A solution of an OX2 precursor compound (for example hexachloroiridic(IV) acid, iridium(III) chloride, iridium nitrate, etc. in the case where $IrO_2$ is used as the conductive oxide) is then added. The suspension is then heated to 70 to 100° C. and $IrO_2$ is subsequently precipitated out by controlled addition of aqueous alkali metal hydroxide solution, whereby the pH has to be adjusted within a range from 6 to 10. Once it has been filtered and washed, the support material thus obtained is dried and optionally calcined. Such a heat treatment can generally be carried out at temperatures in the range from 300 to 800° C., if necessary in an inert gas atmosphere.

To prepare support materials comprising other conductive oxides, the process set out above is modified. Suitable OX2 precursor resp. starting compounds are together added to the suspension of the inorganic oxide OX1 in water. Suitable OX2 precursor compounds for preparing the conductive oxides of the type include for example:

For Ir oxide: hexachloroiridic(IV) acid, iridium(III) chloride, iridium(III) nitrate For Ru oxide: Ru(III) nitrosylnitrate, Ru(III) acetate, Ru(III) acetylacetonate, etc.

For Sb/Sn oxide: $SnCl_4.5H_2O$, Sn acetate, tin(II) nitrate, $SbCl_3$, antimony(III) nitrate, antimony(III) acetate, etc.

For Mo oxide: ammonium molybdate ($[NH_4]_2MoO_4$), sodium molybdate

For W oxide: ammonium tungstate ($[NH_4]_2WO_4$), sodium tungstate

For V oxide: ammonium vanadate ($[NH_4]VO_3$), sodium vanadate

For Nb oxide: ammonium niobate(V) oxalate

For tantalum oxide: ammonium tantalate(V) oxalate

Corresponding OX2 precursor compounds for other conductive oxides are known to those skilled in the art.

The process according to the invention can be carried out on a large industrial scale in a batch process without problems. The subsequent coating with catalytically active species (step b)) can be carried out directly thereafter (i.e., in a "one-pot process") or in a separate process.

Step b): depositing the catalytically active species (i.e., the noble metal particles or noble metal alloy particles) onto the support by precipitation or impregnation with suitable, preferably chloride-free, metal precursor compounds, optionally followed by reduction and/or drying.

Suitable reductants for the process according to the invention are reductants that decompose during the reduction process without leaving a residue, or that leave behind no unwelcome ionic or organic contaminants. Examples include hydrogen, hydrazine, formaldehyde, formic acid but also lower aliphatic alcohols such as ethanol or isopropanol. The reductant is added directly to the reaction solution with stirring, at temperatures in the range from room temperature (i.e., 25° C.) to 100° C.

Noble metal precursor compounds (NM precursors) and also (e.g., when depositing an alloy) base metal precursor compounds can in principle be used as the metal precursor compounds. In the case of noble metal precursor compounds, the following halogen-free or halogen-poor compounds can, for example, be used to prepare the catalytically active particles:

For Pt: hexahydroxyplatinic(IV) acid, ethylammonium hexahydroxyplatinate, tetraammineplatinum(II) nitrate, platinum(IV) nitrate, tetraammineplatinum(II) hydrogencarbonate, tetraammineplatinum(II) hydroxide, bis(ethanolamine)Pt(IV)(OH)$_6$ For Pd: tettraaminepalladium(II) nitrate, palladium(II) nitrate, palladium(II) sulfate hydrate, etc.

Corresponding compounds may also be used for the noble metals Au, Ag, Ir and Os.

The precursor compounds used for the abovementioned base metals are the respective chlorine-free salts of the metals, preferably the nitrate compounds. Examples include Co(II) carbonate, Nickel(II) nitrate, Ni(II) bis hydrogencarbonate, etc.

The pH of the reaction solution should be kept in suitable ranges during the addition of the precursor compounds. This can be achieved by adding buffer components. Deposition of the catalytically active particles is generally effected at temperatures of from 25 to 100° C. Appropriate processes are known to those skilled in the art.

Once the noble metal particles or noble metal alloy particles have been deposited, the resulting electrocatalyst is dried. Drying is preferably effected in the range from 50 to 100° C., optionally in a protective gas atmosphere.

In certain cases (e.g for forming alloys) heat treatment (thermal conditioning) may be necessary. Such heat treatment is generally carried out at temperatures in the range from 300 to 800° C., where necessary in an inert gas atmosphere. The heat treatment is conducted on an industrial scale in suitable batch or conveyor belt furnaces, preferably in the range from 300 to 500° C.

The mean particle size of the noble metal-containing particles P on the conductive multicomponent support material OX1-OX2 is in the range from 1 to 100 nm, preferably in the range from 1.5 to 50 nm, measured using X-ray diffraction (XRD).

The electrocatalysts according to the invention are used in electrochemical apparatuses such as PEM fuel cells, direct methanol fuel cells (DMFC), reversible fuel cells or electrolyzers.

The electrocatalysts according to the invention have an electrochemical surface area (ECA) of from 20 to 120 m$^2$/g, preferably 25 to 100 m$^2$/g. As a result they show a high activity, for example in a PEM fuel cell, both as anode catalysts and as cathode catalysts. The materials according to the invention are preferably used as cathode catalysts in PEM fuel cells.

Typical examples of the electrocatalysts according to the invention include Pt/IrO$_x$—TiO$_2$, PtCo/IrO$_x$—TiO$_2$, Pt/IrO$_x$—Al$_2$O$_3$, Pt/SbSnO$_x$—TiO$_2$, PtNi/SbSnO$_x$—Al$_2$O$_3$, Pt/TaSnO$_x$—TiO$_2$, Pt/NbSnO$_x$—TiO$_2$ or Pt/NbTiO$_x$—TiO$_2$, etc.

Compared to the prior art (i.e., compared to C-supported electrocatalysts), the corrosion resistance of the electrocatalysts according to the invention is considerably enhanced, which is beneficial for long-term use in an automobile and ensures that the performance of the PEM fuel cell is maintained over its entire operating life. Improved corrosion resistance compared to graphitized carbon black supports (C$_{graph}$) is also observed (cf. comparative examples, table 1).

To prepare electrodes, catalyst-coated membranes (CCM's) and membrane-electrode assemblies (MEAs) for PEM fuel cells, the electrocatalysts according to the invention are processed into inks or pastes, by using suitable solvents and optionally with addition of ionomer materials. The catalyst inks are deposited onto gas diffusion layers (GDLs), current collectors, ionomer membranes, preformed PTFE films/sheets, release papers or separator plates or the like, for which processes such as spraying, printing, blade coating or other coating processes may be used. Appropriate methods are known to those skilled in the art.

The present invention is more particularly described by the examples hereinafter without, however, being limited thereto.

EXAMPLES

General Preliminary Remarks

The measurements of specific surface area are carried out after Brunauer, Emmett and Teller (BET) using the nitrogen adsorption method. Mean particle sizes of the NM particles are determined using X-ray diffraction (XRD).

The electrical conductivity of the support materials is determined using a powder resistivity measurement system (Loresta type) from Mitsubishi Chemical (Japan) using a 4-point probe (3.0 mm electrode separation, 0.7 mm electrode radius). The powder to be measured was introduced into a sample container (radius 10.0 mm, amount of sample between 0.7 and 5.9 g) and measured under rising pressure (0 MPa to 50 MPa). The value at 50 MPa is reported.

Electrochemical Measurements

All electrochemical measurements are carried out in the liquid electrolyte (0.1 mol/L perchloric acid). The catalyst samples are dispersed in ultrapure water and affixed onto electrodes composed of glassy carbon (ECA and ORR) or gold (corrosion test). A platinum wire is used as the counter-electrode, Hg/Hg$_2$SO$_4$ as the reference electrode.

The electrochemical surface area of the catalysts (ECA) is determined using cyclic voltammetry at room temperature. The scan rate is 20 mV/s. In order to obtain pseudo steady-state conditions, the third cycle following 40 conditioning cycles between 0 and 1.1 V versus RHE (RHE=reversible hydrogen electrode) is used. The hydrogen adsorption region is evaluated.

The oxygen reduction reaction (ORR) activity is determined using a rotating disk electrode (RDE). The electrolyte is saturated with oxygen at 0.3 V versus RHE and is then swept back and forth between 0 and 1.1 V versus RHE at 20 mV/s. After bedding-in, two measurement cycles are recorded with a scan rate of 20 mV/s. The mass activity in mA/mg$_{Pt}$ at 0.9 V versus RHE is evaluated.

The corrosion resistance of the catalysts is determined by maintaining a high potential of 1.5 V versus RHE for two hours at 60° C. After an initial 43 cycles between 0 and 1.1 V versus RHE, 3 cycles between and 1.5 V are recorded, all at room temperature. Following heating to 60° C., three measurement cycles between 0 and 1.1 V versus RHE (BOL=beginning of life) and three cycles between 0 and 1.5 V versus RHE are recorded. After 2 hours of holding time at 1.5 V and 60° C., three further measuring cycles between 0 and 1.1 V versus RHE are recorded (EOL=end of life). The ECA loss is determined from the difference in ECA values from the respective third cycles of BOL and EOL measurement, and is reported in % based on the starting value (BOL) (cf., table 1).

Example 1

10 wt % of platinum on IrO$_2$—TiO$_2$ a) Preparing the Conductive Support Material The IrO$_x$—TiO$_2$ support material is prepared according to the method described in the patent EP 1701790 B1 by precipitation of hexachloroiridic acid solution (H$_2$IrCl$_6$, 20.5 wt % Ir; Umicore, Hanau) onto titanium dioxide (Hombikat, Sachtleben Chemie GmbH; BET>300 m$^2$/g) using NaOH. 7.49 g of titanium dioxide are suspended in 5.5 l of fully demineralized water (DM water). 124.1 g of hexachloroiridic acid solution (H$_2$IrCl$_6$, 20.5 wt % Ir; Umicore, Hanau) diluted with 200 ml of DM water are added thereto. The suspension is heated to 70 to 90° C. 288 ml of NaOH solution (80 g NaOH in 500 ml of DM water) are then added and the suspension is made up to 8 l with DM water. After 4 hours of stirring at 70° C., the suspension is titrated to pH 7.5 with 20% HCl solution and stirred for a further 1 h at 70 to 90° C. The suspended solid is subsequently filtered off. The filter cake is washed with 0.5% acetic acid and DM water and subsequently dried in a drying cabinet, followed by calcining at 400° C. in a tubular furnace.

The support material has the following characteristics:
- TiO$_2$ content: 22.9 wt %
- IrO$_2$ content: 77.1 wt %
- Specific surface area (BET): 24 m$^2$/g
- Electrical conductivity: 80 S/cm (at 50 MPa)

b) Depositing the Noble Metal-Containing Particles

To deposit the Pt particles, 4.5 g of IrO$_x$—TiO$_2$ support material (prepared in step a) are dispersed in 400 ml of fully demineralized water (DM water), and the dispersion is heated to 80° C. and admixed dropwise with 5.93 g of a solution of bis(ethanolamine)Pt(IV)(OH)$_6$ (9.26 wt % Pt; Umicore, Hanau). Subsequently, about 3.6 ml of a buffer solution (prepared from 108.8 g of sodium acetate trihydrate, 252.2 g of acetic acid (100%) and 4.64 l of DM water) are added in order to bring the mixture to a pH of 5.

Subsequently, 4.72 ml of 5% formic acid are added dropwise over one hour. The solution is filtered off and the filter cake is washed with 750 ml of DM water and then air dried at room temperature. 4.92 g of product are obtained. The mean particle size of the Pt particles is 2 nm (measured using XRD).

Example 2

10 wt % of Pt on IrO$_2$—Al$_2$O$_3$ a) Preparing the Conductive Support Material 21.24 g (dry mass) of aluminum oxide (Puralox SCFa-140, Sasol Germany GmbH, Brunsbuettel; BET=141 m$^2$/g) are suspended in 5.5 l of demineralized water (DM water). 124.1 g of hexachloroiridic acid solution (H$_2$IrCl$_6$, 20.5 wt % Ir; Umicore, Hanau/Germany) diluted with 200 ml of DM water are added. The suspension is heated to 70° C. 288 ml of NaOH solution (80 g NaOH in 500 ml of DM water) are then added and the suspension is made up to 8 l with DM water. After 4 hours of stirring at 70° C., the suspension is titrated to pH 7.5 with 20% HCl solution and stirred for a further 1 h at 70° C. The suspended solid is subsequently filtered off. The filter cake is washed with 0.5% acetic acid and DM water and subsequently dried in a drying cabinet, followed by calcining at 400° C. in a tubular oven.

The support material has the following characteristics:
- IrO$_2$ content: 53.8 wt %
- Al$_2$O$_3$ content: 46.2 wt %
- Specific surface area (BET): 100 m$^2$/g
- Electrical conductivity: 12.1 S/cm (at 50 MPa)

b) Depositing the Pt Particles

To deposit the Pt particles, 1.71 g of support (100 m$^2$/g BET) are dispersed in 400 ml of demineralized water (DM water), and the dispersion is heated to 80° C. and admixed dropwise with 2.02 g of bis(ethanolamine)Pt(IV)(OH)$_6$ (9.41 wt % Pt; Umicore, Hanau). Subsequently, 1.125 ml of buffer solution (sodium acetate/acetic acid, see ex. 1) are added in order to bring the mixture to a pH of 5. Subsequently, 1.79 ml of 5% formic acid are added dropwise over one hour. The solution is filtered off and the filter cake is washed with 500 ml of DM water and then air dried at room temperature. The product obtained shows better oxygen reduction reaction (ORR) activity than a carbon black-supported platinum catalyst (cf. table 1).

Example 3

10 wt % of Pt on Sb/SnO$_x$—TiO$_2$ a) Preparing the Conductive Material 17.25 g of SbCl$_3$ (Merck) and 1.0 l of an HCl solution (37%, Merck) diluted with DM water to 18% (m/m), are added to 238.6 g of SnCl$_4$.5H$_2$O (Sigma-Aldrich) in order to obtain an Sb/Sn solution having the molar composition 1:9. Titanium dioxide (Hombikat, Sachtleben) is precalcined in air at 400° C. 12.3 g thereof (BET 130 m$^2$/g) are dispersed in 1 l of DM water and titrated to pH7 with a solution of 953.7 g of 25% ammonia solution (Merck) in 2 l of DM water. While keeping the pH constant, the Sb/Sn solution is added with stirring. After a further 15 minutes of stirring, the solid is filtered off and washed with DM water, subsequently dried in a drying cabinet, and calcined in air at 500° C.

The support material has the following characteristics:
- Sb/SnOx content: 95.0 wt %
- TiO$_2$ content: 5 wt %
- Specific surface area (BET): 78 m$^2$/g
- Electrical conductivity: about 1.2 S/cm (at 50 MPa)

b) Deposition of the Pt particles

To deposit the Pt particles, 6.75 g (dry mass) of the solid obtained is dispersed in 600 ml of DM water, and the dispersion is heated to 80° C. and admixed dropwise with 7.78 g of bis(ethanolamine)Pt(IV)(OH)$_6$ (9.63 wt % Pt; Umicore, Hanau). Subsequently, 36 ml of buffer solution (sodium acetate/acetic acid, see ex. 1) are added in order to bring the mixture to a pH of 5.

Subsequently, 7.08 ml of 5% formic acid are added dropwise over one hour. The solution is filtered off and the filter cake is washed with aqueous acetic acid and then dried under vacuum at 100° C. The mean particle size of the Pt particles is 4 nm (measured using XRD).

Comparative Example 1 (CE1)

50 wt % of platinum on graphitized carbon black (C$_{graph}$)

150 g of support material (C$_{graph}$, carbon black stabilized by graphitization, BET 80 m$^2$/g, el. conductivity 19.3 S/cm; Evonik-Degussa) are dispersed in 18 l of fully demineralized water (DM water) and the dispersion is heated to 80° C. 1529.1 g of a solution of bis(ethanolamine)Pt(IV)(OH)$_6$ (9.81 wt % Pt; Umicore, Hanau) are made up to 1000 ml with DM water and metered into the support dispersion. Subsequently, 1508.5 g of buffer solution (sodium acetate/acetic acid, see example 1) are added in order to bring the mixture to a pH of 5. Subsequently, 70.75 g of formic acid (98-100%, Merck, Darmstadt) are made up to 1000 ml and added dropwise to the solution over one hour. The solution is filtered off and the filter cake is washed with DM water and then dried under vacuum at 100° C. 306.9 g of product are obtained. The mean particle size of the Pt particles is 7 nm (measured using XRD).

Comparative Example 2 (CE2)

20 wt % of platinum on graphitized carbon black (C$_{graph}$)

240 g of support material (C$_{graph}$, BET 80 m$^2$/g, Evonik-Degussa) are dispersed in about 17 l of fully demineralized water (DM water) and heated to 80° C. 631 g of a solution of bis(ethanolamine)Pt(IV)(OH)$_6$ (9.51 wt % Pt; Umicore, Hanau) are made up to 1000 ml with DM water and metered into the support dispersion. Subsequently 1143.8 g of a buffer solution (sodium acetate/acetic acid, see example 1) are added in order to bring the mixture to a pH of 5. Subsequently, 28.3 g of formic acid (98-100%, Merck, Darmstadt) are made up to 1000 ml and added dropwise to the dispersion over one hour. The solution is filtered off and the filter cake is washed with DM water and then dried under vacuum at 100° C. 308 g of product are obtained. The mean particle size of the Pt particles is 4 nm (measured using XRD).

Electrochemical Measurements

In table 1 the oxygen reduction reaction (ORR) activity and the stability of the electrochemical surface (ECA) at an oxidizing potential of 1.4 V are summarized and compared with the results for two platinum catalysts supported on graphitized carbon black ($C_{graph}$) (CE1, CE2). It is found that the invention electrocatalysts according to examples 1 to 3 have a high electrochemical surface area (ECA) and oxygen reduction reaction (ORR) activity.

Furthermore while the activity is the same or even improved, they show considerably higher corrosion resistance. Thus, the ECA loss of the catalysts according to the invention is in the range from 4-6%, while it is 11% for the C-containing catalyst of CE2.

TABLE 1

Results of electrochemical measurements

| Example | ORR 0.9 V vs RHE (mA/mgPt) | ECA (BOL) ($m^2/g_{Pt}$) | ECA (EOL) ($m^2/g_{Pt}$) | Corrosion resistance (ECA loss) (%) |
|---|---|---|---|---|
| 1 | 500 | 82 | 79 | 4 |
| 2 | 450 | 93 | n.a. | n.a. |
| 3 | n.a. | 38 | 36 | 6 |
| CE1 | 320 | 28 | n.a. | n.a. |
| CE2 | 429 | 44 | 39 | 11 | n.a.: not analyzed

What is claimed is:

1. An electrocatalyst for fuel cells comprising
an electrically conductive support and a catalytically active species, wherein the conductive support is an inorganic multicomponent support material of composition OX1-OX2 wherein
   OX1 is an oxide which is not electrically conductive and has a specific surface area (BET) in the range from 50 to 400 $m^2/g$ and
   OX2 is a conductive oxide
   and wherein the catalytically active species comprises a noble metal selected from the group consisting of ruthenium, osmium, rhodium, iridium, palladium, platinum, silver and gold, or mixtures or alloys thereof.

2. The electrocatalyst as claimed in claim 1, wherein the multicomponent support material OX1-OX2 has an electrical conductivity in the range of >0.01 S/cm.

3. The electrocatalyst as claimed in claim 2, wherein the multicomponent support material OX1-OX2 has an electrical conductivity in the range of >0.1 S/cm.

4. The electrocatalyst as claimed in claim 1, wherein the conductive oxide OX2 is located at or on the surface of the inorganic oxide OX1.

5. The electrocatalyst as claimed in claim 1, wherein the multicomponent support material OX1-OX2 has a core/shell structure.

6. The electrocatalyst as claimed in claim 1, wherein the inorganic oxide OX1 is selected from the group consisting of titanium oxide ($TiO_2$), aluminum oxide ($Al_2O_3$), silicon dioxide ($SiO_2$), zirconium dioxide ($ZrO_2$), yttrium oxide ($Y_2O_3$), cerium oxide ($Ce_2O_3$), cerium dioxide ($CeO_2$), lanthanum oxide ($La_2O_3$), tin oxide ($SnO_2$) and mixtures and combinations thereof.

7. The electrocatalyst as claimed in claim 1, wherein the conductive oxide OX2 is selected from the group consisting of ruthenium(IV) dioxide ($RuO_2$), iridium(IV) oxide ($IrO_2$), tungsten oxide ($WO_x$), molybdenum oxide ($MoO_x$), niobium oxide ($NbO_x$), tantalum oxide ($TaO_x$), tin oxide ($SnO_x$), reduced titanium oxide ($TiO_x$) and mixtures and combinations thereof.

8. The electrocatalyst as claimed in claim 7, wherein the conductive oxide OX2 comprises dopants of the elements vanadium, niobium, tantalum or antimony, dopants of the halide ions $F^-$ or $Cl^-$ or mixtures or combinations thereof.

9. The electrocatalyst as claimed in claim 1, wherein the conductive oxide OX2 is present in proportions of from 10 to 99 wt % (based on the total weight of the support material).

10. The electrocatalyst as claimed in claim 9, wherein the conductive oxide OX2 is present in proportions of from 20 to 95 wt % (based on the total weight of the support material).

11. The electrocatalyst as claimed in claim 1, wherein the catalytically active species comprises platinum or a platinum alloy of a base metal selected from the group consisting of vanadium, chromium, manganese, iron, cobalt, nickel, copper and zinc.

12. The electrocatalyst as claimed in claim 1, wherein the catalytically active species is present on the support material OX1-OX2 in the form of fine particles having a mean particle diameter of between 1 and 100 nm.

13. The electrocatalyst as claimed in claim 1, wherein the catalytically active species is present on the support material OX1-OX2 in proportions of from 5 to 60 wt % (based on the total weight of the catalyst).

14. The electrocatalyst as claimed in claim 13, wherein the catalytically active species is present on the support material OX1-OX2 in proportions of from 5 to 40 wt % (based on the total weight of the catalyst).

15. The electrocatalysts as claimed in claim 1, having the composition Pt/$IrO_x$—$TiO_2$, PtCo/$IrO_x$—$TiO_2$, Pt/$IrO_x$—$Al_2O_3$, Pt/$SbSnO_x$—$TiO_2$, PtNi/$SbSnO_x$—$Al_2O_3$, Pt/$TaSnO_x$—$TiO_2$, Pt/$NbSnO_x$—$TiO_2$ or PtNb$TiO_x$—$TiO_2$.

16. A process for preparing an electrocatalyst comprising an electrically conductive support and a catalytically active species, wherein the conductive support is an inorganic multicomponent support material of composition OX1-OX2 wherein
   OX1 is an oxide which is not electrically conductive and has a specific surface area (BET) in the range from 50 to 400 $m^2/g$ and
   OX2 is a conductive oxide,
   and wherein the catalytically active species comprises a noble metal selected from the group consisting of ruthenium, osmium, rhodium, iridium, palladium, platinum, silver and gold, or mixtures or alloys thereof,
   the process comprising the steps of
   (a) coating the oxide OX1 with the conductive oxide OX2 by precipitation or impregnation with suitable OX2 precursor compounds to form conductive support OX1-OX2, and
   (b) depositing the catalytically active species onto the conductive support OX1-OX2 by precipitation or impregnation with suitable metal precursor compounds.

17. The process as claimed in claim 16, wherein the OX2 precursor compounds are selected from the group consisting of hexachloroiridic(IV) acid, iridium(III) chloride, iridium (III) nitrate, Ru(III) nitrosyl-nitrate, Ru(III) acetate, Ru(III) acetylacetonate, $SnCl_4*5H_2O$, Sn acetate, tin(II) nitrate, $SbCl_3$, antimony(III) nitrate, antimony(III) acetate, ammonium molybdate ($[NH_4]_2MoO_4$), sodium molybdate, ammonium tungstate ($[NH_4]_2WO_4$), sodium tungstate, ammonium vanadate ([NH$_4$]VO$_3$), ammonium niobate(V) oxalate, ammonium tantalate(V) oxalate and sodium vanadate.

18. The process as claimed in claim 16, wherein the metal precursor compounds comprise halogen-free and/or halogen-poor compounds of a noble metal.

19. The process as claimed in claim 16 further comprising drying and/or calcining of the conductive support OX1-OX2 after step (a).

20. The process as claimed in claim 16 further comprising a reduction, drying or calcining step, or a combination of such steps, after step (b).

21. A PEM fuel cell, direct methanol fuel cell (DMFC), regenerative fuel cell or electrolyzer comprising the electrocatalyst as claimed in claim 1.

* * * * *